Mar. 3, 1925.

H. ANDERSON

RAT TRAP

Filed Feb. 9, 1924

1,528,647

Inventor
H. Anderson
By Victor J. Evans
Attorney

Patented Mar. 3, 1925.

1,528,647

UNITED STATES PATENT OFFICE.

HERBERT ANDERSON, OF WEST BOYLSTON, MASSACHUSETTS.

RAT TRAP.

Application filed February 9, 1924. Serial No. 691,780.

*To all whom it may concern:*

Be it known that I, HERBERT ANDERSON, a citizen of the United States, residing at West Boylston, in the county of Worcester and State of Massachusetts, have invented new and useful Improvements in Rat Traps, of which the following is a specification.

This invention relates to traps, and has for its object the provision of a novel device designed primarily for use in a rat hole for catching rats, though the device might be constructed in a smaller size for catching mice or in larger sizes for catching woodchucks, rabbits or other animals which burrow in the ground, the essential feature being the construction in such manner that the device may be inserted at or into a hole in such position that the animal must pass through a choker loop in order to make his exit from the hole.

An important object is the provision of a device of this character which will be extremely simple and inexpensive to manufacture, easy to set, safe to the operator, and highly efficient as a killer of rats and the like.

With the above and other objects and advantages in view the invention consists in the details of construction to be hereinafter more fully described and claimed and illustrated in the accompanying drawings, in which:

Figure 1:
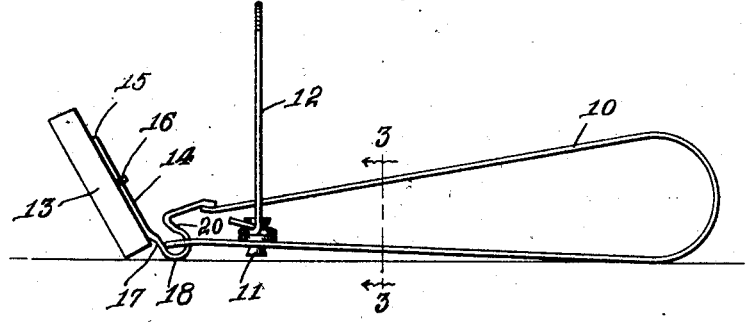
Figure 1 is a side elevation of the device showing it in set position.
Figure 2:
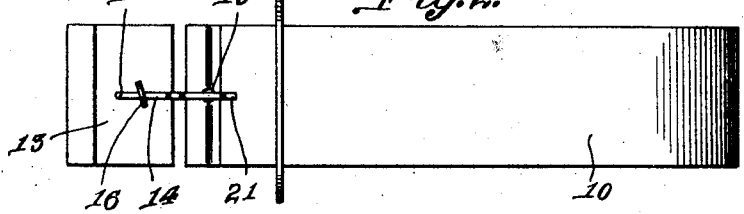
Figure 2 is a top plan view.
Figure 4:
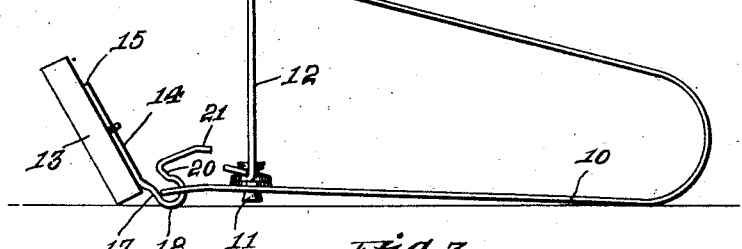
Figure 4 is a side elevation showing the device sprung.
Figure 3:
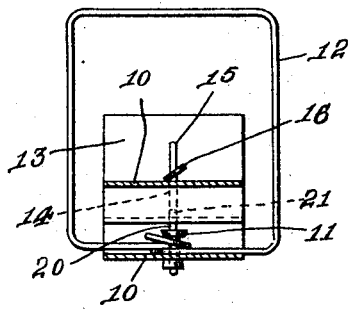
Figure 3 is a cross section on the line 3—3 of Figure 1.

Referring more particularly to the drawings I have shown the device as comprising a substantially V-shaped leaf spring 10 upon the inner face of one arm of which is secured, at 11, a preferably rectangular loop or choker 12 which straddles the other arm. The numeral 13 represents the pan or treadle which might be constructed as a sheet of metal but which is preferably formed as a block of wood and which has secured thereto a trigger device 14 which may be formed from a single length of wire having one end laterally deflected to define a prong 15 driven into the block of the treadle. Additional securing is effected by means of a staple 16 driven into the block in straddling relation to the trigger member. The intermediate portion of this trigger member is inclined and offset with respect to the treadle as shown at 17 and is formed with an open loop 18 pivotally engaged through a hole 19 in the first mentioned arm of the spring near the end thereof. The other terminal of the trigger member extends at substantially right angles to the treadle as shown at 20 and is bent to define a lip 21 engageable over the free end of the other arm of the spring, as shown in Figures 1 to 3 for holding the spring under tension.

In use, the trap is set as indicated and inserted within or placed in the entrance of the hole through which the animal is accustomed to travel. It will be noted that the pan or treadle is disposed in substantially upright position so that it will be necessary, in order for the animal to pass through the hole, that he pass over the upper arm of the spring and beneath the choker member 12. The treadle or pan partially obstructs the hole so that in passing through the rat or other animal must necessarily step upon the treadle which will result in swinging the same and withdrawing the lip 21 from engagement with the arm of the spring. The spring is then released and flies violently upwardly, either choking the animal or breaking its spine.

When the device is used for catching mice and the like the construction is the same except that it is made on a smaller scale and for catching larger animals for the sake of their pelts or for any other reason the device must naturally be made larger and heavier and in such case it is preferable that an anchoring chain be connected with the spring at the bight portion thereof as is customary in connection with steel traps. For catching woodchucks or other similar animals the device is very satisfactory and is far more humane than the steel traps commonly used, as this trap kills instead of merely maiming the animal and causing suffering.

From the foregoing description and a study of the drawings it will be apparent that I have thus provided a simply constructed, inexpensive and yet highly efficient trap which will be easy to set and which will readily catch and kill the animals for which it is intended, a feature of advantage being that there is no necessity for using any bait.

While I have shown and described the preferred embodiment of my invention it is of course to be understood that I reserve the right to make such changes in the form, construction and arrangement of parts as will not depart from the spirit of the invention or the scope of the subjoined claims.

Having thus described my invention I claim:

1. In a trap of the character described, a substantially V-shaped spring, an upstanding choker arch mounted upon the lower arm of the spring and arranged in straddling relation to the upper arm thereof, a treadle located beyond the end of said first named arm and normally arranged in an upwardly inclined direction in partially obstructing relation to passage through said arch member, and a combined trigger and pivot member carried by said treadle, connected with said lower arm and engaging over the free end of the upper arm.

2. A trap comprising a V-shaped spring, an upstanding choker loop mounted upon one arm thereof and straddling the other arm, and a treadle pivoted upon the first mentioned arm and having a trigger engageable with the free end of the other arm for maintaining the spring under compression, the trigger member being formed from a single piece of resilient wire secured to the treadle and having its intermediate portion formed with an eye, the first mentioned arm of the spring having a hole through which said eye is passed for effecting pivotal mounting of the treadle.

In testimony whereof I affix my signature.

HERBERT ANDERSON.